United States Patent
Fujikawa et al.

(10) Patent No.: US 10,550,219 B2
(45) Date of Patent: Feb. 4, 2020

(54) CURABLE COMPOSITION AND OPTICAL ELEMENT OBTAINED USING SAME

(71) Applicant: DAICEL CORPORATION, Osaka-shi, Osaka (JP)

(72) Inventors: Takeshi Fujikawa, Himeji (JP); Kyohei Ishida, Himeji (JP)

(73) Assignee: DAICEL CORPORATION, Osaka-Shi, Osaka (JP)

( * ) Notice: Subject to any disclaimer, the term of this patent is extended or adjusted under 35 U.S.C. 154(b) by 0 days.

(21) Appl. No.: 15/750,797

(22) PCT Filed: Jul. 14, 2016

(86) PCT No.: PCT/JP2016/070803
§ 371 (c)(1),
(2) Date: Feb. 6, 2018

(87) PCT Pub. No.: WO2017/026225
PCT Pub. Date: Feb. 16, 2017

(65) Prior Publication Data
US 2018/0230260 A1 Aug. 16, 2018

(30) Foreign Application Priority Data
Aug. 7, 2015 (JP) .................................. 2015-156988

(51) Int. Cl.
| | |
|---|---|
| C08F 2/46 | (2006.01) |
| C08F 2/50 | (2006.01) |
| C08G 61/04 | (2006.01) |
| C08G 59/24 | (2006.01) |
| C08K 5/134 | (2006.01) |
| C08K 5/20 | (2006.01) |

(52) U.S. Cl.
CPC ............ *C08G 59/24* (2013.01); *C08K 5/1345* (2013.01); *C08K 5/20* (2013.01)

(58) Field of Classification Search
CPC ......... C08G 59/24; C08K 5/20; C08K 5/1345
USPC ............. 522/27, 7, 6, 71, 1, 189, 184; 520/1
See application file for complete search history.

(56) References Cited

U.S. PATENT DOCUMENTS

| | | | |
|---|---|---|---|
| 6,809,889 B2 | 10/2004 | Tokuda et al. | |
| 8,071,697 B2 | 12/2011 | Frisch et al. | |
| 8,530,539 B2* | 9/2013 | Miyake | B82Y 10/00 264/299 |
| 2003/0059618 A1* | 3/2003 | Takai | C07D 303/16 428/413 |
| 2003/0113544 A1 | 6/2003 | Tokuda et al. | |
| 2008/0185601 A1 | 8/2008 | Frisch et al. | |
| 2009/0004579 A1* | 1/2009 | Sarmah | G03F 7/0037 430/18 |
| 2009/0041945 A1* | 2/2009 | Ookubo | B41M 5/0023 427/511 |
| 2012/0052310 A1* | 3/2012 | Keller | A01G 9/1438 428/437 |
| 2012/0251841 A1* | 10/2012 | Southwell | G03F 7/0037 428/704 |
| 2015/0044623 A1* | 2/2015 | Rundlett | C08G 59/226 433/6 |
| 2016/0334701 A1* | 11/2016 | Fujikawa | G03F 7/0007 |

(Continued)

FOREIGN PATENT DOCUMENTS

| | | |
|---|---|---|
| EP | 3305825 A1 | 4/2018 |
| JP | 11-92539 A | 4/1999 |

(Continued)

OTHER PUBLICATIONS

Watanabe et al, JP 2008-248408 Machine Translation Part 1, Oct. 16, 2008 (Year: 2008).*

(Continued)

*Primary Examiner* — Jessica Whiteley
(74) *Attorney, Agent, or Firm* — Birch, Stewart, Kolasch & Birch, LLP

(57) ABSTRACT

The present invention provides a curable composition excellent in curability and capable of forming, through light irradiation, a cured product excellent in light resistance, heat resistance, and transparency. The curable composition contains the following component (A), the following component (B), and the following component (C):

the component (A): an alicyclic epoxy compound represented by the following formula (a):

the component (B): a light resistance imparting agent having a maximum absorption wavelength in a region between 280 and 320 nm in an ultraviolet-visible light absorption spectrum from 250 to 400 nm; and the component (C): an optical cationic polymerization initiator:

[Formula 1]

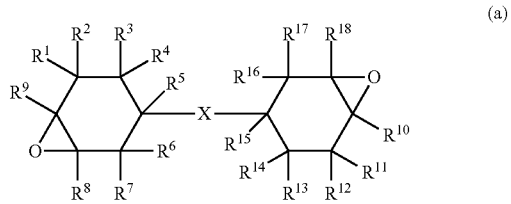

wherein $R^1$ to $R^{18}$ are the same as or different from one another and represent a hydrogen atom, a halogen atom, a hydrocarbon group that may contain an oxygen atom or a halogen atom, or an alkoxy group that may have a substituent; and X represents a single bond or a linking group.

18 Claims, No Drawings

(56) References Cited

U.S. PATENT DOCUMENTS

| | | | |
|---|---|---|---|
| 2017/0130079 A1* | 5/2017 | Mizuta | C08F 216/165 |
| 2017/0152346 A1* | 6/2017 | Mizuta | C08F 216/14 |
| 2017/0158812 A1* | 6/2017 | Mizuta | B41J 2/01 |
| 2017/0158814 A1* | 6/2017 | Mizuta | C08F 16/14 |
| 2017/0227190 A1* | 8/2017 | Fujikawa | G02B 1/041 |
| 2017/0232695 A1* | 8/2017 | Fujikawa | B29C 39/02 359/742 |
| 2017/0260323 A1* | 9/2017 | Fujikawa | C08G 59/24 |
| 2018/0196167 A1* | 7/2018 | Fujikawa | B29C 39/24 |
| 2018/0215861 A1* | 8/2018 | Fujikawa | B29C 39/02 |
| 2018/0230260 A1 | 8/2018 | Fujikawa et al. | |
| 2018/0237579 A1* | 8/2018 | Fujikawa | B29C 39/02 |
| 2018/0320006 A1* | 11/2018 | Lee | C08F 2/50 |

FOREIGN PATENT DOCUMENTS

| | | | |
|---|---|---|---|
| JP | 2005-119124 A | | 5/2005 |
| JP | 2007-16079 A | | 1/2007 |
| JP | 4124991 B2 | | 7/2008 |
| JP | 2008-248408 | * | 10/2008 |
| JP | 2009-197180 A | | 9/2009 |
| JP | 2010-248408 A | | 11/2010 |
| JP | 4800383 B2 | | 10/2011 |
| JP | 2012-82272 A | | 4/2012 |
| JP | 2013-205719 A | | 10/2013 |
| JP | 2013-205720 A | | 10/2013 |
| JP | 6204420 B2 | | 9/2017 |
| WO | WO 2014/196515 A1 | | 12/2014 |
| WO | WO-2017087614 A1 * | 5/2017 | C08F 2/50 |

OTHER PUBLICATIONS

Watanabe et al, JP 2008-248408 Machine Translation Part 2, Oct. 16, 2008 (Year: 2008).*

English translation of the International Preliminary Report on Patentability (Forms PCT/IB/338 and PCT/IPEA/409), dated Feb. 8, 2018, for International Application No. PCT/JP2016/070803.

International Search Report for PCT/JP2016/070803 (PCT/ISA/210) dated Sep. 6, 2016.

Written Opinion of the International Searching Authority for PCT/JP2016/070803 (PCT/ISA/237) dated Sep. 6, 2016.

Japanese Notification of Reasons for Refusal for Japanese Application No. 2017-165190, dated Apr. 2, 2019, with English translation.

Extended European Search Report dated May 27, 2019, for Counterpart European Patent Application No. 16834922.3.

* cited by examiner

CURABLE COMPOSITION AND OPTICAL ELEMENT OBTAINED USING SAME

TECHNICAL FIELD

The present invention relates to a curable composition, and a cured product, an optical element and an optical device obtained using the same. The present application is based upon and claims the benefit of priority of the prior Japanese Patent Application No. 2015-156988 filed on Aug. 7, 2015, the entire contents of which are incorporated herein by reference.

BACKGROUND ART

In recent years, there are increasing demands for portable electronic devices such as cellular phones and smartphones. Such an electronic device is equipped with a small and thin imaging unit, and the imaging unit includes a solid-state image sensor (such as a CCD image sensor or a CMOS image sensor) and an optical element such as a lens in general.

For purposes of increasing the production efficiency, an optical element equipped in an electronic device is required to have heat resistance and heat yellowing resistance sufficient for mounting the element by a reflow soldering method. Besides, since use of lead is restricted due to environmental considerations in recent years, soldering is carried out using lead-free solder, and hence, further higher heat resistance (about 270° C.) is required.

It is known that a thermoplastic resin such as polycarbonate, or a thermo- or photo-curable resin such as an acrylic-based resin or a silicone-based resin is used for the above-described optical element (see, for example, Patent Literatures 1 to 4).

CITATION LIST

Patent Literature

Patent Literature 1: Japanese Patent Laid-Open No. 2005-119124
Patent Literature 2: Japanese Patent No. 4800383
Patent Literature 3: Japanese Patent No. 4124991
Patent Literature 4: Japanese Patent Laid-Open No. 11-092539

SUMMARY OF INVENTION

Technical Problem

A thermoplastic resin described in Patent Literature 1 does not have, however, heat resistance (reflow heat resistance) sufficient to withstand a reflow step performed at a high temperature (of, for example, about 270° C.). Therefore, a cured product of such a thermoplastic resin is degraded in transparency due to a high temperature in some cases.

On the other hand, a cured product of a thermo-curable resin or a photo-curable resin is comparatively good in light resistance but does not have sufficient transparency. Besides, in a cured product of a photo-curable resin, an ultraviolet absorber may be used for improving the light resistance, but in this case, curability may be sometimes insufficient. Therefore, there is currently a demand for a curable composition excellent in curability and capable of forming a cured product excellent in heat resistance, light resistance and transparency.

Accordingly, an object of the present invention is to provide a curable composition excellent in curability and capable of forming, through light irradiation, a cured product excellent in light resistance, heat resistance and transparency.

Besides, another object of the present invention is to provide a cured product obtained by curing the curable composition and excellent in all of heat resistance, light resistance, transparency and heat yellowing resistance.

Still another object of the present invention is to provide an optical element including the cured product as a composing element, or an optical device including the optical element.

Solution to Problem

The present inventors made earnest studies to solve the above-described problems, and as a result, have found that a curable composition containing a specific epoxy compound, a specific light resistance imparting agent, and an optical cationic polymerization initiator is excellent in curability and is capable of forming, through light irradiation, a cured product excellent in heat resistance, light resistance, and transparency. The present invention was accomplished based on these findings.

Specifically, the present invention provides a curable composition containing the following component (A), the following component (B), and the following component (C):
the component (A): an alicyclic epoxy compound represented by the following formula (a):

[Formula 1]

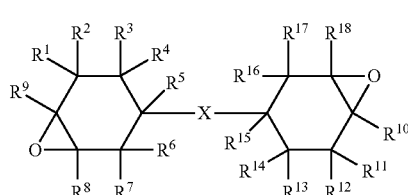

(a)

wherein $R^1$ to $R^{18}$ are the same as or different from one another and represent a hydrogen atom, a halogen atom, a hydrocarbon group that may contain an oxygen atom or a halogen atom, or an alkoxy group that may have a substituent; and X represents a single bond or a linking group;
the component (B): a light resistance imparting agent having a maximum absorption wavelength in a region between 280 and 320 nm in an ultraviolet-visible light absorption spectrum from 250 to 400 nm; and the component (C): an optical cationic polymerization initiator.

The present invention also provides the curable composition further containing an antioxidant.

The present invention also provides a cured product obtained by curing the curable composition.

The present invention also provides a method for producing a cured product in which the curable composition is irradiated with a UV-LED (wavelength: 350 to 400 nm).

The present invention also provides an optical element containing the cured product.

The present invention also provides an optical device including the optical element.

Specifically, the present invention relates to the following:

[1] A curable composition containing the following component (A), the following component (B), and the following component (C):

the component (A): an alicyclic epoxy compound represented by the following formula (a):

[Formula 1]

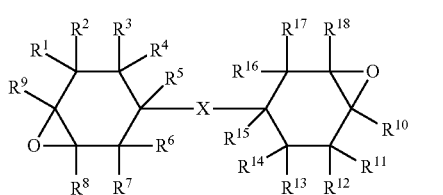

wherein $R^1$ to $R^{18}$ are the same as or different from one another and represent a hydrogen atom, a halogen atom, a hydrocarbon group that may contain an oxygen atom or a halogen atom, or an alkoxy group that may have a substituent; and X represents a single bond or a linking group;

the component (B): a light resistance imparting agent having a maximum absorption wavelength in a region between 280 and 320 nm in an ultraviolet-visible light absorption spectrum from 250 to 400 nm; and the component (C): an optical cationic polymerization initiator.

[2] The curable composition according to [1], in which a content of the component (A) in the curable composition is 10 to 95% by weight with respect to a total amount (100% by weight) of the curable composition.

[3] The curable composition according to [1] or [2], in which a content of the component (A) in a total amount (100% by weight) of cationic curable compounds contained in the curable composition is not less than 10% by weight.

[4] The curable composition according to any one of [1] to [3], in which the component (B) is an oxanilide-based compound.

[5] The curable composition according to any one of [1] to [3], in which the component (B) is a compound represented by the following formula (c):

[Formula 4]

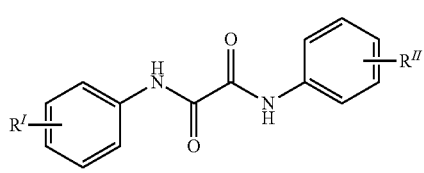

In formula (c), $R^I$ and $R^{II}$ each represent a group directly bonded to a phenyl group in formula, and the number of the groups is 5. $R^I$ and $R^{II}$ are the same as or different from each other and represent a hydrogen atom, an alkyl group that may have a substituent, an alkoxy group that may have a substituent, or an alkylthio group that may have a substituent.

[6] The curable composition according to any one of [1] to [5], in which a content of the component (B) in the curable composition is not less than 0.01% by weight and less than 5% by weight with respect to a total amount (100% by weight) of the curable composition.

[7] The curable composition according to any one of [1] to [6], in which the component (C) is a sulfonium salt-based compound.

[8] The curable composition according to any one of [1] to [7], in which an amount of the component (C) blended is 0.01 to 15 parts by weight with respect to 100 parts by weight of cationic curable compounds contained in the curable composition.

[9] The curable composition according to any one of [1] to [8], further containing an antioxidant.

[10] The curable composition according to [9], in which the antioxidant is a phenol-based antioxidant.

[11] The curable composition according to [9] or [10], in which a content of the antioxidant is 0.05 to 5.0 parts by weight with respect to 100 parts by weight of cationic curable compounds contained in the curable composition.

[12] A cured product obtained by curing the curable composition according to any one of [1] to [11].

[13] The cured product according to [12], in which a 5% weight loss temperature obtained by simultaneous differential thermal analysis-thermogravimetry is not less than 260° C.

[14] The cured product according to [12] or [13], in which a yellowness index (YI) measured before a heat-resistance test is not more than 1.0.

[15] The cured product according to any one of [12] to [14], in which a yellowness index (YI) measured after continuously performing a heat-resistance test three times based on a reflow temperature profile (maximum temperature: 270° C.) according to JEDEC Standards is not more than 3.0.

[16] The cured product according to any one of [12] to [15], in which a yellowness index (YI) measured after light irradiation at cumulative irradiation of 5000 mJ/cm$^2$ is not more than 4.0.

[17] A method for producing a cured product in which the curable composition according to any one of [1] to [11] is irradiated with a UV-LED (wavelength: 350 to 400 nm).

[18] An optical element containing the cured product according to any one of [12] to [16].

[19] An optical device including the optical element according to [18].

Advantageous Effects of Invention

Owing to the above-described structure, the curable composition of the present invention is excellent in curability and can form, through light irradiation, a cured product excellent in heat resistance, light resistance, and transparency. Therefore, the curable composition of the present invention can be suitably used as an optical element material (such as a lens or prism material, a sealant, a material for forming an optical waveguide, an adhesive, a material for forming an optical fiber, an imprinting material, or a material for forming alternative glass), a resist, a coating agent and the like. When the curable composition of the present invention is used as, for example, an optical element material, the resultant optical element is excellent in transparency, and is inhibited from yellowing even when subjected to a reflow soldering step, and hence, optical characteristics can be retained high. Therefore, the optical element does need to be mounted in a separate step but can be mounted on a board all together with other components by reflow soldering, and thus, an optical device including the optical element can be produced with excellent work efficiency.

Besides, the optical element can be used in electronic devices for vehicles requiring heat resistance.

DESCRIPTION OF EMBODIMENTS

A curable composition of the present invention contains the following component (A), the following component (B), and the following component (C). The curable composition of the present invention may contain a component other than the component (A), the component (B) and the component (C).

Component (A): an alicyclic epoxy compound represented by formula (a)

Component (B): a light resistance imparting agent having a maximum absorption wavelength in a region between 280 and 320 nm in an ultraviolet-visible light absorption spectrum from 250 to 400 nm Component (C): an optical cationic polymerization initiator

[Component (A)]

The component (A), which is an essential component of the curable composition of the present invention, is a cationic curable compound represented by the following formula (a). Since the component (A) is excellent in cationic curability, the curable composition of the present invention is excellent in curability. Besides, since the component (A) is contained, a cured product formed from the curable composition of the present invention is excellent in heat resistance, light resistance, and transparency. As the component (A), one compound can be singly used, or not less than two compounds can be used in combination.

[Formula 2]

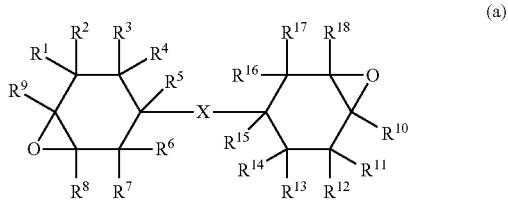

(a)

In formula (a), $R^1$ to $R^{18}$ are the same as or different from one another and represent a hydrogen atom, a halogen atom, a hydrocarbon group that may contain an oxygen atom or a halogen atom, or an alkoxy group that may have a substituent. X represents a single bond or a linking group.

Examples of the halogen atom in $R^1$ to $R^{18}$ include a fluorine atom, a chlorine atom, a bromine atom, and an iodine atom.

Examples of the hydrocarbon group in $R^1$ to $R^{18}$ include an aliphatic hydrocarbon group, an alicyclic hydrocarbon group, an aromatic hydrocarbon group, and a group formed by bonding not less than two of these.

Examples of the aliphatic hydrocarbon group include alkyl groups having 1 to 20 carbon atoms ($=C_{1-20}$ alkyl groups) (preferably $C_{1-10}$ alkyl groups, and particularly preferably $C_{1-4}$ alkyl groups) such as methyl, ethyl, propyl, isopropyl, butyl, hexyl, octyl, isooctyl, decyl, and dodecyl groups; $C_{2-20}$ alkenyl groups (preferably $C_{2-10}$ alkenyl groups, and particularly preferably $C_{2-4}$ alkenyl groups) such as vinyl, allyl, metallyl, 1-propenyl, isopropenyl, 1-butenyl, 2-butenyl, 3-butenyl, 1-pentenyl, 2-pentenyl, 3-pentenyl, 4-pentenyl, and 5-hexenyl groups; and $C_{2-20}$ alkynyl groups (preferably $C_{2-10}$ alkynyl groups, and particularly preferably $C_{2-4}$ alkynyl groups) such as ethynyl and propynyl groups.

Examples of the alicyclic hydrocarbon group include $C_{3-12}$ cycloalkyl groups such as cyclopropyl, cyclobutyl, cyclopentyl, cyclohexyl, and cyclododecyl groups; $C_{3-12}$ cycloalkenyl groups such as a cyclohexenyl group; and $C_{4-15}$ crosslinked cyclic hydrocarbon groups such as bicycloheptanyl and bicycloheptenyl groups.

Examples of the aromatic hydrocarbon group include $C_{6-14}$ aryl groups (preferably a $C_{6-10}$ aryl group) such as phenyl and naphthyl groups.

Besides, examples of the group formed by bonding not less than two groups selected from an aliphatic hydrocarbon group, an alicyclic hydrocarbon group and an aromatic hydrocarbon group include $C_{3-12}$ cycloalkyl-substituted $C_{1-20}$ alkyl groups such as a cyclohexylmethyl group; $C_{1-20}$ alkyl-substituted $C_{3-12}$ cycloalkyl groups such as a methylcyclohexyl group; $C_{7-18}$ aralkyl groups (particularly, $C_{7-10}$ aralkyl groups) such as a benzyl group and a phenethyl group; $C_{6-14}$ aryl-substituted $C_{2-20}$ alkenyl groups such as a cinnamyl group; $C_{1-20}$ alkyl-substituted $C_{6-14}$ aryl groups such as a tolyl group; and $C_{2-20}$ alkenyl-substituted $C_{6-14}$ aryl groups such as a styryl group.

An example of the hydrocarbon group that may contain an oxygen atom or a halogen atom in $R^1$ to $R^{18}$ includes the above-described hydrocarbon groups in which at least one hydrogen atom is replaced by an oxygen atom-containing group or a halogen atom. Examples of the oxygen atom-containing group include a hydroxy group; a hydroperoxy group; $C_{1-10}$ alkoxy groups such as methoxy, ethoxy, propoxy, isopropyloxy, butoxy and isobutyloxy groups; $C_{2-10}$ alkenyloxy groups such as an allyloxy group; $C_{6-14}$ aryloxy groups that may have a substituent selected from a $C_{1-10}$ alkyl group, a $C_{2-10}$ alkenyl group, a halogen atom, and a $C_{1-10}$ alkoxy group (such as tolyloxy and naphthyloxy groups); $C_{7-18}$ aralkyloxy group such as benzyloxy and phenethyloxy groups; $C_{1-10}$ acyloxy groups such as acetyloxy, propionyloxy, (meth)acryloyloxy, and benzoyloxy groups; $C_{1-10}$ alkoxycarbonyl groups such as methoxycarbonyl, ethoxycarbonyl, propoxycarbonyl, and butoxycarbonyl groups; $C_{6-14}$ aryloxycarbonyl group that may have a substituent selected from a $C_{1-10}$ alkyl group, a $C_{2-10}$ alkenyl group, a halogen atom, and a $C_{1-10}$ alkoxy group (such as phenoxycarbonyl, tolyloxycarbonyl, or naphthyloxycarbonyl groups); $C_{7-18}$ aralkyloxycarbonyl groups such as a benzyloxycarbonyl group; epoxy group-containing groups such as a glycidyloxy group; oxetanyl group-containing groups such as an ethyloxetanyloxy group; $C_{1-10}$ acyl groups such as acetyl, propionyl, and benzoyl groups; an isocyanate group; a sulfo group; a carbamoyl group; an oxo group; and groups formed by bonding not less than two of these via a single bond, a $C_{1-10}$ alkylene group or the like. Examples of the halogen atom in the hydrocarbon group that may have a halogen atom include a fluorine atom, a chlorine atom, a bromine atom, and an iodine atom.

Examples of the alkoxy group in $R^1$ to $R^{18}$ include $C_{1-10}$ alkoxy groups such as methoxy, ethoxy, propoxy, isopropyloxy, butoxy, and isobutyloxy groups.

Examples of the substituent that may be possessed by an alkoxy group include a halogen atom, a hydroxy group, a $C_{1-10}$ alkoxy group, a $C_{2-10}$ alkenyloxy group, a $C_{6-14}$ aryloxy group, a $C_{1-10}$ acyloxy group, a mercapto group, a $C_{1-10}$ alkylthio group, a $C_{2-10}$ alkenylthio group, a $C_{6-14}$ arylthio group, a $C_{7-18}$ aralkylthio group, a carboxy group, a $C_{1-10}$ alkoxycarbonyl group, a $C_{6-14}$ aryloxycarbonyl group, a $C_{7-18}$ aralkyloxycarbonyl group, an amino group, a monoor di-$C_{1-10}$ alkylamino group, a $C_{1-10}$ acylamino group, an epoxy group-containing group, an oxetanyl group-containing group, a $C_{1-10}$ acyl group, an oxo group, and a group formed by bonding not less than two of these via a single bond, a $C_{1-10}$ alkylene group or the like.

As $R^1$ to $R^{18}$, a hydrogen atom is particularly preferable.

X in formula (a) represents a single bond or a linking group (a divalent group having not less than one atom). Examples of the linking group include a divalent hydrocarbon group, a carbonyl group, an ether bond, an ester bond, an amide group, and a group formed by bonding a plurality of these. Examples of the divalent hydrocarbon group include linear or branched $C_{1-18}$ alkylene groups (preferably, a linear or branched $C_{1-3}$ alkylene group) such as methylene, methylmethylene, dimethylmethylene, ethylene, propylene and trimethylene groups; and $C_{3-12}$ cycloalkylene groups and $C_{3-12}$ cycloalkylidene groups (preferably, $C_{3-6}$ cycloalkylene groups and $C_{3-6}$ cycloalkylidene groups) such as 1,2-cyclopentylene, 1,3-cyclopentylene, cyclopentylidene, 1,2-cyclohexylene, 1,3-cyclohexylene, 1,4-cyclohexylene, and cyclohexylidene groups.

Representative examples of the compound represented by formula (a) include 3,4-epoxycyclohexylmethyl (3,4-epoxy)cyclohexane carboxylate, (3,4,3',4'-diepoxy)bicyclohexyl, bis(3,4-epoxycyclohexylmethyl) ether, 1,2-epoxy-1,2-bis(3,4-epoxycyclohexane-1-yl)ethane, 2,2-bis(3,4-epoxycyclohexane-1-yl)propane, and 1,2-bis(3,4-epoxycyclohexane-1-yl)ethane.

The compound represented by formula (a) can be produced by, for example, reacting a compound represented by the following formula (a') with a peroxy acid (such as peracetic acid) for epoxidizing a double bond portion in formula (a'). It is noted that $R^1$ to $R^{18}$ in formula (a') and X are defined as above.

[Formula 3]

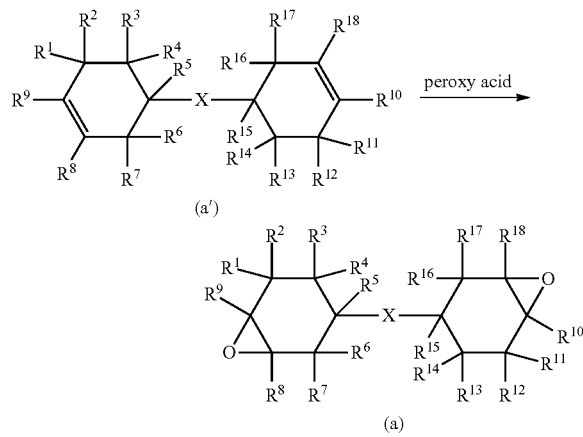

A content of the component (A) (a total amount, if not less than two compounds are contained) in the curable composition of the present invention is not especially limited, and is preferably 10 to 95% by weight, more preferably 15 to 90% by weight, and further preferably 20 to 85% by weight with respect to a total amount (100% by weight) of the curable composition. If the content of the component (A) is not less than 10% by weight, the curability of the curable composition, and heat resistance, light resistance and transparency of a resultant cured product tend to be more excellent. On the other hand, if the content is not more than 95% by weight, an other cationic curable compound described later can be used, and an effect resulting from the use tends to be easily obtained.

A content of the component (A) (a total amount, if not less than two compounds are contained) in a total amount (100% by weight) of cationic curable compounds contained in the curable composition is not especially limited, and is preferably not less than 10% by weight (for example, 10 to 100% by weight), more preferably 15 to 90% by weight, and further preferably 20 to 85% by weight. If the content of the component (A) is not less than 10% by weight, the curability of the curable composition, and the heat resistance, the light resistance and the transparency of the cured product tend to be more excellent.

[Component (B)]

The component (B), which is an essential component of the curable composition of the present invention, is a light resistance imparting agent having a maximum absorption wavelength in a region between 280 and 320 nm in an ultraviolet-visible light absorption spectrum from 250 to 400 nm. Specifically, when the ultraviolet-visible light absorption spectrum of the component (B) is measured, the maximum value of absorbance in a range from 250 to 400 nm is present in the region between 280 and 320 nm. The component (B) easily transmits light of a wavelength necessary for polymerization of the component (A), and can block transmission of light of a specific wavelength. Therefore, when the component (B) is contained, the curable composition of the present invention is excellent in curability, and the cured product formed from the curable composition of the present invention is excellent in heat resistance, light resistance and transparency. As the component (B), one compound can be singly used, or not less than two compounds can be used in combination.

Examples of the component (B) include an ultraviolet absorber and a light stabilizer. In particular, from the viewpoint of attaining more sufficient curability of the curable composition, an ultraviolet absorber is preferably used.

The component (B) is not especially limited, and is preferably an oxanilide-based compound, and more preferably a compound represented by the following formula (c):

[Formula 4]

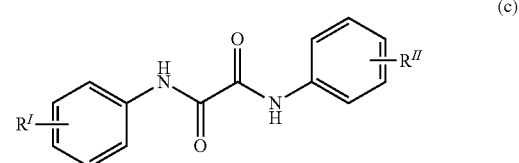

In formula (c), $R^I$ and $R^{II}$ each represent a group directly bonded to a phenyl group in formula, and the number of the groups is 5.

In formula (c), $R^I$ and $R^{II}$ may be the same as or different from each other and represent a hydrogen atom, an alkyl group that may have a substituent, an alkoxy group that may have a substituent, or an alkylthio group that may have a substituent.

The number of carbon atoms of each of the alkyl group that may have a substituent, the alkoxy group that may have a substituent, and the alkylthio group that may have a substituent is not especially limited, and is preferably 1 to 22, more preferably 1 to 10, and further preferably 1 to 4. If $R^I$ or $R^{II}$ has a plurality of alkyl groups that may have a substituent, alkoxy groups that may have a substituent, or alkylthio groups that may have a substituent, the plurality of alkyl groups that may have a substituent, alkoxy groups that may have a substituent, or alkylthio groups that may have a substituent may be the same as or different from one another.

Examples of the substituent in the alkyl group that may have a substituent, the alkoxy group that may have a substituent, and the alkylthio group that may have a substituent include those described above as the examples of the substituent that may be possessed by an alkoxy group in $R^1$ to $R^{18}$ of formula (a).

The compound represented by formula (c) particularly preferably has, as each of $R^I$ and $R^{II}$, two of the not less than one selected from the group consisting of an alkyl group that may have a substituent, an alkoxy group that may have a substituent, and an alkylthio group that may have a substituent, and more preferably has two of the not less than one selected from the group consisting of an alkyl group that may have a substituent, and an alkoxy group that may have a substituent.

Specific examples of the compound represented by formula (c) include 2-methyl-2'-ethoxy oxalanilide, 2-ethyl-2'-ethoxyoxalanilide (=N-(2-ethoxyphenyl)-N'-(2-ethylphenyl)oxamide), 4,4'-dioctyloxy oxalanilide, 2,2'-diethoxy oxalanilide, 2,2'-dioctyloxy-5,5'-di-t-tertiary butoxalanilide, 2,2'-didodecyloxy-5,5'-di-tertiary butoxalanilide, 2-ethoxy-5-tertiary butyl-2'-ethoxalanilide and a mixture thereof with 2-ethoxy-2'-ethyl-5,4'-di-tertiary butoxalanilide, 2-ethoxy-2'-ethyl-5,4'-d-tertiary butoxalanilide (=N-(5-tert-butyl-2-ethoxyphenyl)-N'-(4-tert-butyl-2-ethylphenyl)oxamide), a mixture of o- and p-methoxy-disubstituted oxalanilides, and a mixture of o- and p-ethoxy-disubstituted oxalanilides. As the compound represented by formula (c), a commercially available product can be used, and examples include those available under tradenames "Hostavin VSU", "Hostavin 3206", and "Hostavin JPV" (all manufactured by Clariant Japan K.K.), and tradenames "TINUVIN 312" and "TINUVIN 315" (both manufactured by BASF Corporation).

A content of the component (B) (a total amount, if not less than two compounds are contained) in the curable composition of the present invention is not especially limited, and is preferably not less than 0.01% by weight and less than 5% by weight, more preferably 0.05 to 1% by weight, and further preferably 0.1 to 0.5% by weight with respect to the total amount (100% by weight) of the curable composition. If the content of the component (B) is not less than 0.01% by weight, the curability of the curable composition and the heat resistance, the light resistance, and the transparency of the cured product tend to be more excellent. On the other hand, if the content of the component (B) is less than 5% by weight, economic efficiency due to cost reduction and the transparency of the cured product tend to be more excellent.

The curable composition of the present invention may contain, a light resistance imparting agent other than the component (B) (a light resistance imparting agent having a maximum absorption wavelength in a region out of the region between 280 and 320 nm in the ultraviolet-visible light absorption spectrum from 250 to 400 nm) (hereinafter sometimes referred to as the "other light resistance imparting agent"). Examples of the other light resistance imparting agent include a benzophenone-based ultraviolet absorber, a triazole-based ultraviolet absorber, and a triazine-based ultraviolet absorber. A content of the other light resistance imparting agent is not especially limited, and from the viewpoint of attaining more excellent curability of the curable composition of the present invention, is preferably not more than 1% by weight (for example, 0 to 1% by weight), more preferably not more than 0.5% by weight, further preferably not more than 0.1% by weight, particularly preferably not more than 0.01% by weight, and most preferably 0% by weight with respect to the total amount (100% by weight) of the curable composition.

[Component (C)]

The component (C), that is, an essential component of the curable composition of the present invention, is an optical cationic polymerization initiator. An optical cationic polymerization initiator is a compound that initiates a curing reaction of a cationic curable compound by generating cationic species through light irradiation, and consists of a cation portion absorbing light and an anion portion working as an acid generating source.

Examples of the optical cationic polymerization initiator include a diazonium salt-based compound, an iodonium salt-based compound, a sulfonium salt-based compound, a phosphonium salt-based compound, a selenium salt-based compound, an oxonium salt-based compound, an ammonium salt-based compound, and a bromine salt-based compound. In the present invention, a sulfonium salt-based compound is particularly preferably used because a cured product excellent in curability can be thus formed.

Examples of the cation portion of the sulfonium salt-based compound include arylsulfonium ions (particularly a triarylsulfonium ion) such as a triphenylsulfonium ion, a diphenyl[4-(phenylthio)phenyl]sulfonium ion, a tri-p-tolyl-sulfonium ion, a (4-hydroxyphenyl)methylbenzylsulfonium ion, and a 4-(4-biphenylylthio)phenyl-4-biphenylyl phenyl sulfonium ion.

Examples of the anion portion include $[(Y)_sB(Phf)_{4-s}]^-$ (wherein Y represents a phenyl group or a biphenylyl group; Phf represents a phenyl group in which at least one hydrogen atom is substituted by at least one selected from the group consisting of a perfluoroalkyl group, a perfluoroalkoxy group and a halogen atom; and s represents an integer of 0 to 3), $BF_4^-$, $[(Rf)_nPF_{6-n}]^-$ (Rf: an alkyl group in which not less than 80% of hydrogen atoms is substituted by a fluorine atom, and n: an integer of 0 to 5), $AsF_6^-$, $SbF_6^-$, and pentafluorohydroxyantimonate.

As the component (C), for example, (4-hydroxyphenyl)methylbenzylsulfonium tetrakis(pentafluorophenyl)borate, 4-(4-biphenylthio)phenyl-4-biphenylylphenylsulfonium tetrakis(pentafluorophenyl)borate, 4-(phenylthio)phenyldiphenylsulfonium phenyltris(pentafluorophenyl)borate, [4-(4-biphenylylthio)phenyl]-4-biphenylylphenylsulfonium phenyltris(pentafluorophenyl)borate, diphenyl[4-(phenylthio)phenyl]sulfonium tris(pentafluoroethyl)trifluorophosphate, diphenyl[4-(phenylthio)phenyl]sulfonium tetrakis(pentafluorophenyl)borate, diphenyl[4-(phenylthio)phenyl]sulfonium hexafluorophosphate, 4-(4-biphenylylthio)phenyl-4-biphenylylphenylsulfonium tris(pentafluoroethyl)trifluorophosphate, bis[4-(diphenylsulfonio)phenyl]sulfide phenyltris(pentafluorophenyl)borate, [4-(2-thioxanthonylthio)phenyl]phenyl-2-thioxanthonylsulfonium phenyltris(pentafluorophenyl)borate, and products commercially available under tradenames "Cyracure UVI-6970", "Cyracure UVI-6974", "Cyracure UVI-6990" and "Cyracure UVI-950" (all manufactured by Union Carbide Corporation, USA), "Irgacure 250", "Irgacure 261" and "Irgacure 264" (all manufactured by Ciba Specialty Chemicals Corporation), "SP-150", "SP-151", "SP-170", and "Optomer SP-171" (all manufactured by ADEKA Corporation), "CG-24-61" (manufacture by Ciba Specialty Chemicals Corporation), "DAICAT II" (manufactured by Daicel Corporation), "UVAC 1590" and "UVAC 1591" (both manufactured by Daicel-Cytec Company Ltd.), "CI-2064", "CI-2639", "CI-2624", "CI-2481", "CI-2734", "CI-2855", "CI-2823", "CI-2758", and "CIT-1682" (all manufactured by Nippon Soda Co., Ltd.), "PI-2074" (manufactured by Rhodia, tetrakis(pentafluorophenyl borate) toluylcumyliodonium salt), "FFC509" (manufactured by 3M Company), "BBI-102", "BBI-101", "BBI-103", "MPI-103", "TPS-103", "MDS-103", "DTS-103", "NAT-103", and "NDS-103" (all manufactured by Midori Kagaku Co., Ltd.), "CD-1010", "CD-1011", "CD-1012" (all manufactured by Sartomer, USA), and "CPI-100P", "CPI-101A" and "CPI-200K" (manufactured by San-Apro Ltd.) can be used.

As the component (C), one compound can be singly used, or not less than two compounds may be used in combination. An amount used (amount blended) is preferably 0.01 to 15 parts by weight, more preferably 0.01 to 10 parts by weight, further preferably 0.05 to 10 parts by weight, and particularly preferably 0.1 to 5 parts by weight with respect to 100 parts by weight of the cationic curable compounds (for example, a total amount of the cationic curable compounds such as an epoxy compound and an oxetane compound) contained in the curable composition. If the component (C) is used in an amount within the above-described range, a cured product excellent in heat resistance, light resistance, transparency and optical characteristics can be obtained.

[Other Cationic Curable Compound]

The curable composition of the present invention may contain one, or not less than two cationic curable compounds other than the component (A) (sometimes referred to as the "other cationic curable compound").

Examples of the other cationic curable compound include a compound having not less than one epoxy group in a molecule and being other than the component (A) (sometimes referred to as the "other epoxy compound"), a compound having not less than one oxetane group in a molecule (sometimes referred to as the "oxetane compound"), a compound having not less than one vinyl ether group in a molecule (sometimes referred to as the "vinyl ether compound"), and a compound having not less than two hydroxy groups in a molecule (sometimes referred to as the "polyol compound"). When the other cationic curable compound is contained, the viscosity of the curable composition of the present invention is controlled, so that the handleability can be improved, and that the mechanical strength, the thermal stability, the reliability, and the optical characteristics (such as a refractive index) of the cured product can be improved.

Examples of the other epoxy compound include a compound having not less than one glycidyl ether group in a molecule. Examples of the compound having not less than one glycidyl ether group in a molecule include aromatic glycidyl ether-based epoxy compounds such as a bisphenol A epoxy compound, a bisphenol F epoxy compound, a biphenol epoxy compound, a phenol novolac epoxy compound, a cresol novolac epoxy compound, a cresol novolac epoxy compound of bisphenol A, a naphthalene epoxy compound, and an epoxy compound obtained from trisphenolmethane; a hydrogenated glycidyl ether-based epoxy compound; a glycidyl ester-based epoxy compound; and a glycidyl amine-based epoxy compound.

The hydrogenated glycidyl ether-based epoxy compound includes, for example, compounds obtained by hydrogenating bisphenol A epoxy compounds (hydrogenated bisphenol A epoxy compounds) such as 2,2-bis[4-(2,3-epoxypropoxy)cyclohexyl]propane, 2,2-bis[3,5-dimethyl-4-(2,3-epoxypropoxy)cyclohexyl]propane, and multimers thereof; compounds obtained by hydrogenating bisphenol F epoxy compounds (hydrogenated bisphenol F epoxy compounds) such as bis[o,o-(2,3-epoxypropoxy)cyclohexyl]methane, bis [o,p-(2,3-epoxypropoxy)cyclohexyl]methane, bis[p,p-(2,3-epoxypropoxy)cyclohexyl]methane, bis[3,5-dimethyl-4-(2,3-epoxypropoxy)cyclohexyl]methane, and multimers thereof; a hydrogenated biphenol epoxy compound; a hydrogenated phenol novolac epoxy compound; a hydrogenated cresol novolac epoxy compound; a hydrogenated cresol novolac epoxy compound of bisphenol A; a hydrogenated naphthalene epoxy compound; and a hydrogenated epoxy compound of an epoxy compound obtained from trisphenolmethane. For example, a commercially available product available under tradename "YX8000" (manufactured by Mitsubishi Chemical Corporation) can be used.

Examples of the oxetane compound include trimethylene oxide, 3,3-bis(vinyloxymethyl)oxetane, 3-ethyl-3-hydroxymethyl oxetane, 3-ethyl-3-(2-ethylhexyloxymethyl) oxetane, 3-ethyl-3-(hydroxymethyl)oxetane, 3-ethyl-3-[(phenoxy)methyl]oxetane, 3-ethyl-3-(hexyloxymethyl) oxetane, 3-ethyl-3-(chloromethyl)oxetane, 3,3-bis(chloromethyl)oxetane, 1,4-bis[(3-ethyl-3-oxetanylmethoxy)methyl]benzene, bis{[1-ethyl(3-oxetanyl)]methyl} ether, 4,4'-bis[(3-ethyl-3-oxetanyl) methoxymethyl]bicyclohexyl, 1,4-bis[(3-ethyl-3-oxetanyl) methoxymethyl]cyclohexane, and 3-ethyl-3{[(3-ethyloxetane-3-yl)methoxy]methyl}oxetane. For example, commercially available products available under tradenames "Arone Oxetane OXT221" and "Arone Oxetane OXT101" (both manufactured by Toagosei Co., Ltd.) can be used.

Examples of the vinyl ether compound include 2-hydroxyethyl vinyl ether, 3-hydroxypropyl vinyl ether, 2-hydroxypropyl vinyl ether, 2-hydroxyisopropyl vinyl ether, 4-hydroxybutyl vinyl ether, 3-hydroxybutyl vinyl ether, 2-hydroxybutyl vinyl ether, 3-hydroxyisobutyl vinyl ether, 2-hydroxyisobutyl vinyl ether, 1-methyl-3-hydroxypropyl vinyl ether, 1-methyl-2-hydroxypropyl vinyl ether, 1-hydroxymethylpropyl vinyl ether, 4-hydroxycyclohexyl vinyl ether, 1,6-hexanediol monovinyl ether, 1,4-cyclohexanedimethanol monovinyl ether, 1,3-cyclohexanedimethanol monovinyl ether, 1,2-cyclohexanedimethanol monovinyl ether, p-xylene glycol monovinyl ether, m-xylene glycol monovinyl ether, o-xylene glycol monovinyl ether, diethylene glycol monovinyl ether, triethylene glycol monovinyl ether, tetraethylene glycol monovinyl ether, pentaethylene glycol monovinyl ether, oligoethylene glycol monovinyl ether, polyethylene glycol monovinyl ether, dipropylene glycol monovinyl ether, tripropylene glycol monovinyl ether, tetrapropylene glycol monovinyl ether, pentapropylene glycol monovinyl ether, oligopropylene glycol monovinyl ether, polypropylene glycol monovinyl ether, and derivatives of these.

A molecular weight of the polyol compound is not especially limited, and is preferably not less than 200, more preferably 200 to 100000, further preferably 300 to 50000, and particularly preferably 400 to 40000. The molecular weight of the polyol compound means a number average molecular weight in terms of standard polystyrene measured by gel permeation chromatography (GPC).

Examples of the polyol compound include polyester polyol, polyether polyol, and polycarbonate polyol. The polyol compound further includes, for example, a phenoxy resin, a polybutadiene or derivative thereof having a hydroxyl group, and acrylic polyol.

As the polyester polyol, commercially available products available under tradenames "Placcel 205", "Placcel 205H", "Placcel 205U", "Placcel 205BA", "Placcel 208", "Placcel 210", "Placcel 210CP", "Placcel 210BA", "Placcel 212", "Placcel 212CP", "Placcel 220", "Placcel 220CPB", "Placcel 220NP1", "Placcel 220BA", "Placcel 220ED", "Placcel 220EB", "Placcel 220EC", "Placcel 230", "Placcel 230CP", "Placcel 240", "Placcel 240CP", "Placcel 210N", "Placcel 220N", "Placcel L205AL", "Placcel L208AL", "Placcel L212AL", "Placcel L220AL", "Placcel L230AL", "Placcel 305", "Placcel 308", "Placcel 312", "Placcel L312AL", "Placcel 320", "Placcel L320AL", "Placcel L330AL", "Placcel 410", "Placcel 410D", "Placcel 610", "Placcel P3403", and "Placcel CDE9P" (all manufactured by Daicel Corporation) can be used.

Examples of the polyether polyol include multimers of polyols such as ethylene glycol, diethylene glycol, 1,2-propanediol (propylene glycol), 2-methyl-1,3-propanediol, 1,3-propanediol, 1,4-butanediol (tetramethylene glycol), 1,3-butanediol, 2,3-butanediol, 1,5-pentanediol, 2-methyl-1,5-pentanediol, 3-methyl-1,5-pentanediol, 2,3,5-trimethyl-1,5-pentanediol, 1,6-hexanediol, 2-ethyl-1,6-hexanediol, 2,2,4-trimethyl-1,6-hexanediol, 2,6-hexanediol, 1,8-octanediol, 1,4-cyclohexanedimethanol, 1,2-dimethylolcyclohexane, 1,3-dimethylolcyclohexane, 1,4-dimethylolcyclohexane, 1,12-dodecanediol, polybutadienediol, neopentyl glycol, dipropylene glycol, glycerin, trimethylolpropane, 1,3-dihydroxyacetone, hexylene glycol, 1,2,6-hexanetriol, ditrimethylolpropane, mannitol, sorbitol, and pentaerythritol; adducts of the polyol(s) and an alkylene oxide such as ethylene oxide, propylene oxide, 1,2-butylene oxide, 1,3-butylene oxide, 2,3-butylene oxide, tetrahydrofuran, and epichlorohydrin; and a ring-opened polymer of a cyclic ether such as tetrahydrofurans (such as polytetramethylene glycol).

As the polycarbonate polyol, for example, commercially available products available under tradenames "Placcel CD205PL", "Placcel CD205HL", "Placcel CD210PL", "Placcel CD210HL", "Placcel CD220PL", and "Placcel CD220HL" (all manufactured by Daicel Corporation), tradenames "UH-CARB50", "UH-CARB100", "UH-CARB300", "UH-CARB90(1/3)", "UH-CARB90(1/1)", and "UC-CARB100" (all manufactured by Ube Industries, Ltd.), and tradenames "PCDL T4671", "PCDL T4672", "PCDL T5650J", "PCDL T5651" and "PCDL T5652" (all manufactured by Asahi Kasei Chemicals Corporation) can be used.

As a polyol other than the polyether polyol, the polyester polyol and the polycarbonate polyol, a phenoxy resin such as commercially available products available under tradenames "YP-50", "YP-50S", "YP-55U", "YP-70", "ZX-1356-2", "YPB-43C", "YPB-43M", "FX-316", "FX-310T40", "FX-280S", "FX-293", "YPS-007A30", and "TX-1016" (all manufactured by Nippon Steel Chemical Co., Ltd.), and tradenames "jER1256", "jER4250" and "jER4275" (all manufactured by Mitsubishi Chemical Corporation); a bisphenol-type high molecular epoxy resin having an epoxy equivalent more than 1000 g/eq. such as products available under tradenames "Epotot YD-014", "Epotot YD-017", "Epotot YD-019", "Epotot YD-020G", "Epotot YD-904", "Epotot YD-907", and "Epotot YD-6020" (all manufactured by Nippon Steel Chemical Co., Ltd.), and tradenames "jER1007", "jER1009", "jER1010", "jER1005F", "jER1009F", "jER1006FS", and "jER1007FS" (all manufactured by Mitsubishi Chemical Corporation); a polybutadiene or derivative thereof having a hydroxyl group such as products available under tradenames "Poly bd R-45HT", "Poly bd R-15HT", "Poly ip" and "KRASOL" (all manufactured by Idemitsu Kosan Co., Ltd.), and tradenames "α-ω polybutadiene glycol G-1000", "α-ω polybutadiene glycol G-2000", and "α-ω polybutadiene glycol G-3000" (all manufactured by Nippon Soda Co., Ltd.); and an acrylic polyol such as products available under tradenames "Hitaloid 3903", "Hitaloid 3904", "Hitaloid 3905", "Hitaloid 6500", "Hitaloid 6500B", and "Hitaloid 3018X" (all manufactured by Hitachi Chemical Co., Ltd.), tradenames "Acrydic DL-1537", "Acrydic BL-616", "Acrydic AL-1157", "Acrydic A-322", "Acrydic A-817", "Acrydic A-870", "Acrydic A-859-B", "Acrydic A-829", and "Acrydic A-49-394-IM" (all manufactured by DIC Corporation), and tradenames "Dianal SR-1346", "Dianal SR-1237", and "Dianal AS-1139" (all manufacture by Mitsubishi Rayon Co., Ltd.) can be used.

If the curable composition of the present invention contains the other cationic curable compound, a content of the other cationic curable compound (a total amount, if not less than two compounds are contained) is not especially limited, and is preferably 5 to 85% by weight, more preferably 10 to 80% by weight, and further preferably 15 to 75% by weight with respect to the total amount (100% by weight) of the curable composition. If the content is not less than 5% by weight, the effects of the use of the other cationic curable compound tend to be more easily obtained. On the other hand, if the content is not more than 85% by weight, a sufficient amount of the component (A) can be used.

If the curable composition of the present invention contains the other cationic curable compound, a content of the other cationic curable compound (a total amount, if not less than two compounds are contained) in the total amount (100% by weight) of the cationic curable compounds contained in the curable composition is not especially limited, and is preferably 5 to 85% by weight, more preferably 10 to 80% by weight, and further preferably 15 to 75% by weight. If the content is not less than 5% by weight, the effects of the use of the other cationic curable compound tend to be more easily obtained. On the other hand, if the content is not more than 85% by weight, a sufficient amount of the component (A) can be used.

[Other Components]

The curable composition of the present invention may contain other components in addition to the component (A), the component (B), the component (C), and the other cationic curable compound as long as the effects of the present invention are not impaired. Examples of the other component include an antioxidant, a filler, a photosensitizer, an antifoaming agent, a leveling agent, a coupling agent, a surfactant, a flame retardant, a decoloring agent, a tackifier, and a colorant. One of these can be singly used, or not less than two of these can be used in combination.

The curable composition of the present invention particularly preferably contains an antioxidant because an effect of improving the heat yellowing resistance of the cured product can be thus obtained. Examples of the antioxidant include a phenol-based antioxidant, a phosphorus-based antioxidant, a thioester-based antioxidant, and an amine-based antioxidant. One of these can be singly used, or not less than two of these can be used in combination. In the present invention, a phenol-based antioxidant is particularly preferably used because this antioxidant is particularly excellent in the effect of improving the heat yellowing resistance.

Examples of the phenol-based antioxidant include pentaerythritol tetrakis[3(3,5-di-t-butyl-4-hydroxyphenyl)propionate], thiodiethylene bis[3-(3,5-di-t-butyl-4-hydroxyphenyl)propionate], octadecyl 3-(3,5-di-t-butyl-4-hydroxyphenyl) propanoate, N,N'-hexamethylenebis[3-(3,5-di-t-butyl-4-hydroxyphenyl)propionamide], octyl 3-(4-hydroxy-3,5-diisopropylphenyl) propionate, 1,3,5-tris(4-hydroxy-3,5-di-t-butylbenzyl)-2,4,6-trimethylbenzene, 2,4-bis(dodecylthiomethyl)-6-methylphenol, and calcium bis[3,5-di(t-butyl)-4-hydroxybenzyl (ethoxy)phosphinate]. In the present invention, for example, commercially available products available under tradenames "Irganox 1010", "Irganox 1035", "Irganox 1076", "Irganox 1098", "Irganox 1135", "Irganox 1330", "Irganox 1726", and "Irganox 1425WL" (all manufactured by BASF Corporation) can be used.

A content of the antioxidant is not especially limited, and is preferably 0.05 to 5.0 parts by weight, and more preferably 0.1 to 3.0 parts by weight with respect to 100 parts by weight of the cationic curable compound (the total amount, if not less than two compounds are contained) contained in the curable composition.

The curable composition of the present invention may contain a filler having various functions (of, for example, an insulating property, strength, viscosity, flame retardancy, a conductive property, brightness, an antibacterial property and the like). The filler includes an inorganic filler and an organic filler.

Examples of the inorganic filler include calcium carbonate, magnesium carbonate, clay, kaolin, calcium phosphate, hydroxyapatite, mica, talc, silica, a quartz powder, a glass powder, diatomite, nepheline syenite, cristobalite, wollastonite, aluminum hydroxide, iron oxide, zinc oxide, titanium oxide, alumina, calcium sulfate, barium sulfate, dolomite, silicon carbide, silicon nitride, boron nitride, a metal powder, graphite, carbon black, hydroxyapatite silver, and zeolite silver. Examples of the organic filler include particulates of various polymers such as crosslinked methyl polymethacrylate. One of these fillers can be singly used, or not less than two of these can be used in combination.

The surface of the filler may be subjected to a treatment with a surface treatment agent such as a silane coupling agent.

The shape of the filler is not especially limited, and may be any one of a spherical shape, an ellipsoidal shape, a cylindrical shape, a prismatic shape and the like. The particle size of the filler can be appropriately selected in accordance with the use as long as dispersibility is not impaired, and the diameter or the major axis is, for example, about 0.001 to 50 μm.

The amount of filler particles used is, for example, 1 to 30 parts by weight, and preferably 5 to 20 parts by weight with respect to 100 parts by weight of the cationic curable compound (the total amount, if not less than two compounds are contained) contained in the curable composition.

Besides, the curable composition of the present invention may contain a colorant. The colorant (or a coloring matter) includes a pigment and a dye. One of these can be singly used, or not less than two of these can be used in combination.

Examples of the pigment include inorganic pigments [such as carbon black, chromium oxide, iron oxide, titanium black, acetylene black, lamp black, bone black, graphite, iron black, copper chromium-based black, copper/iron/manganese-based black, cobalt/iron/chromium-based black, ruthenium oxide, graphite, metal fine particles (of, for example, aluminum), metal oxide fine particles, composite oxide fine particles, metal sulfide fine particles, and metal nitride fine particles], organic pigments [such as perylene black, cyanine black, aniline black, an azo-based pigment, an anthraquinone-based pigment, an isoindolinone-based pigment, an indanthrene-based pigment, an indigo-based pigment, a quinacridone-based pigment, a dioxazine-based pigment, a tetraazaporphyrin-based pigment, a triarylmethane-based pigment, a phthalocyanine-based pigment, a perylene-based pigment, a benzimidazolone-based pigment, and a rhodamine-based pigment], and pigments obtained by coating the surface of an inorganic pigment with an organic material such as a resin.

Examples of the dye include azo-based dyes, anthraquinone-based dyes (such as acid violet 39, acid violet 41, acid violet 42, acid violet 43, acid violet 48, acid violet 51, acid violet 34, acid violet 47, acid violet 109, acid violet 126, basic violet 24, basic violet 25, disperse violet 1, disperse violet 4, disperse violet 26, disperse violet 27, disperse violet 28, disperse violet 57, solvent violet 11, solvent violet 13, solvent violet 14, solvent violet 26, solvent violet 28, solvent violet 31, solvent violet 36, solvent violet 37, solvent violet 38, solvent violet 48, solvent violet 59, solvent violet 60, vat violet 13, vat violet 15, and vat violet 16), indigo-based dyes, carbonyl-based dyes, xanthene-based dyes, quinonimine-based dyes, quinoline-based dyes, tetraazaporphyrin-based dyes, triarylmethane-based dyes, naphthoquinone-based dyes, nitro-based dyes, phthalocyanine-based dyes, fluoran-based dyes, perylene-based dyes, methine-based dyes, and rhodamine-based dyes.

A content of the colorant (a total amount, if not less than two colorants are contained) can be appropriately adjusted in accordance with the use, and is, for example, about 10 to 300 ppm with respect to the total amount of the curable composition of the present invention, and the lower limit is preferably 50 ppm, and particularly preferably 100 ppm.

[Curable Composition]

The curable composition of the present invention contains the component (A) that is the compound represented by formula (a), the component (B) that is a light resistance imparting agent, and the component (C) that is an optical cationic polymerization initiator. The curable composition of the present invention can be prepared by mixing, under stirring, these components in a prescribed ratio, and by degassing the resultant under vacuum if necessary.

The curable composition of the present invention can be adjusted in the viscosity [at 25° C. and a shear rate of 20 (1/s)] to a range of, for example, 50 to 3000 mPa·s (preferably 50 to 1000 mPa·s) in accordance with the use.

The curable composition of the present invention is excellent in cationic curability, and can be rapidly cured through light irradiation to form a cured product.

Light (active energy rays) used in the light irradiation may be any light causing a polymerization reaction of the curable composition to proceed, and any one of infrared rays, visible rays, ultraviolet rays, X-rays, electron beams, α-rays, β-rays, and γ-rays can be used. In the present invention, ultraviolet rays are particularly preferably used from the viewpoint of excellent handleability. For the irradiation with the ultraviolet rays, for example, a UV-LED (wavelength: 350 to 400 nm), a high pressure mercury lamp, an ultra-high pressure mercury lamp, a xenon lamp, a carbon arc lamp, a metal halide lamp, sunlight, a laser, or the like can be used.

For the irradiation with the ultraviolet rays, the amount of irradiation of the light is preferably adjusted to attain cumulative irradiation of, for example, not more than 5000 mJ/cm$^2$ (for example, 1000 to 4000 mJ/cm$^2$). Besides, after the irradiation with the ultraviolet rays, the resultant is preferably allowed to stand still at room temperature (1 to 30° C.) for 1 to 48 hours because the curability can be thus improved.

The cured product obtained by curing the curable composition of the present invention is excellent in heat resistance, and has a 5% weight loss temperature of, for example, not less than 260° C., preferably not less than 280° C., and particularly preferably not less than 300° C. It is noted that the 5% weight loss temperature can be obtained by simultaneous differential thermal analysis-thermogravimetry (TG-DTA). Therefore, the cured product can retain the shape thereof even under high temperature conditions such as in the reflow soldering.

The cured product obtained by curing the curable composition of the present invention is excellent in transparency, and a yellowness index (YI) of the cured product measured before a heat-resistance test is, for example, not more than 1.0. It is noted that a method for measuring a yellowness index is performed in the same manner as in an evaluation method for "transparency (YI)" described in an example below.

A yellowness index (YI) of the cured product obtained by curing the curable composition of the present invention measured after performing, continuously three times, a heat-resistance test based on a reflow temperature profile (maximum temperature: 270° C.) according to JEDEC Standards is not especially limited, and is preferably not more than 3.0, more preferably not more than 2.5, further preferably not more than 2.0, and particularly preferably not more than 1.8.

A yellowness index (YI) of the cured product obtained by curing the curable composition of the present invention measured after light irradiation at cumulative irradiation of 5000 mJ/cm$^2$ is not especially limited, and is preferably not more than 4.0, more preferably not more than 3.0, further preferably not more than 2.0, and particularly preferably less than 1.5.

Since the curable composition of the present invention has all the above-described characteristics, it can be suitably used as an optical element material (such as a lens or prism material, a sealant, a material for forming an optical waveguide, an adhesive, a material for forming an optical fiber, an imprinting material, or a material for forming alternative glass), a resist, a coating agent and the like.

[Optical Element]

An optical element of the present invention is an optical element containing, as a composing element, the cured product obtained by curing the curable composition. Therefore, the optical element of the present invention has excellent curability as well as heat resistance and heat yellowing resistance.

The optical element of the present invention includes, for example, a lens, a prism, an LED, an organic EL element, a semiconductor laser, a transistor, a solar cell, a CCD image sensor, an optical waveguide, an optical fiber, and alternative glass (such as a substrate for a display, a hard disk substrate or a polarizing film).

The optical element of the present invention is excellent in heat resistance. Therefore, the optical element can be mounted all together with other components when being mounted on a board by a reflow process. Besides, the optical element can be used in electronic devices for vehicles requiring heat resistance.

[Optical Device]

An optical device of the present invention is an optical device including the optical element, and can be produced by, for example, mounting the optical element on a board by the reflow soldering. Examples of the optical device of the present invention include portable electronic devices such as a cellular phone, a smartphone, and a tablet PC (personal computer); and electronic devices for vehicles such as a near-infrared sensor, a millimeter-wave radar, an LED spot lighting device, a near-infrared LED lighting device, a mirror monitor, a meter panel, a combiner for a (projection) head-mounted display, and a combiner for a head-up display. In the optical device of the present invention, the optical element need not be mounted in a separate step but can be mounted all together with other components by the reflow soldering, and therefore, the optical device can be produced efficiency and at low cost.

EXAMPLES

The present invention will now be more specifically described with reference to Examples, and it is noted that the present invention is not limited to these Examples.

Production Example 1 (Production of (3,4,3',4'-Diepoxy)bicyclohexyl (a-1))

A dehydration catalyst was prepared by mixing, under stirring, 70 g (0.68 mole) of 95% by weight sulfuric acid and 55 g (0.36 mole) of 1,8-diazabicyclo[5.4.0]undecene-7 (DBU).

A 3 L flask equipped with a stirrer, a thermometer, and a distillation tube filled with a dehydrating agent and kept warm was charged with 1000 g (5.05 mole) of hydrogenated biphenol (4,4'-dihydroxybicyclohexyl), 125 g (0.68 mole in terms of sulfuric acid) of the dehydrogenation catalyst prepared as described above, and 1500 g of pseudocumene, and the flask was heated. Generation of water was observed when the inside temperature exceeded about 115° C. The heating was further continued to increase the temperature up to the boiling point of pseudocumene (corresponding to the inside temperature of 162 to 170° C.), and a dehydrogenation reaction was performed at normal pressure. Water generated as a byproduct was distilled to be discharged through a dehydrogenation tube to the outside of the system. The dehydrogenation catalyst was in a liquid form under reaction conditions and was finely dispersed in a reaction solution. After 3 hours had elapsed, a substantially theoretical amount (180 g) of water was distilled, and hence the reaction was completed.

After distilling pseudocumene off from the completed reaction solution using an oldershaw distillation column of ten stages, the resultant was distilled at an inside pressure of 10 Torr (1.33 kPa) and an inside temperature of 137 to 140° C. to obtain 731 g of bicyclohexyl-3,3'-diene.

A reactor was charged with 243 g of the thus obtained bicyclohexyl-3,3'-diene and 730 g of ethyl acetate, and with nitrogen blown into a gas phase portion and with the temperature within a reaction system controlled to 37.5° C., 274 g of a 30% by weight peracetic acid solution in ethyl acetate (moisture content: 0.41% by weight) was added thereto in a dropwise manner over about 3 hours. After completing the dropwise addition, the resultant solution was aged at 40° C. for 1 hour, and the reaction was completed. The resultant crude solution obtained by completing the reaction was washed with water at 30° C., a low-boiling point compound was removed at 70° C./20 mmHg, and thus 270 g of a reaction product was obtained. An oxirane oxygen content of the reaction product was 15.0% by weight. Besides, when $^1$H-NMR thereof was measured, it was found that a peak derived from an internal double bond in the vicinity of δ 4.5 to 5 ppm had disappeared, and that a proton peak derived from an epoxy group had been generated in the vicinity of δ 3.1 ppm, and hence, the reaction product was confirmed as (3,4,3',4'-diepoxy)bicyclohexyl.

Production Example 2 (Production of Bis(3,4-epoxycyclohexylmethyl) Ether (a-2))

A 5 L reactor was charged with sodium hydroxide (in a granular form) (499 g, 12.48 mole) and toluene (727 mL), and after nitrogen substitution, a tetrahydrobenzyl alcohol (420 g, 3.74 mole) solution in toluene (484 mL) was added thereto, and the resultant was aged at 70° C. for 1.5 hours. Subsequently, tetrahydrobenzyl methanesulfonate (419 g, 2.20 mole) was added thereto, the resultant was aged for 3 hours under reflux, and then cooled to room temperature, the reaction was stopped by adding water (1248 g) thereto, and the resultant solution was separated. The thus separated organic layer was concentrated and was distilled under reduced pressure to obtain ditetrahydrobenzyl ether in the form of a colorless transparent liquid (yield: 85%). The $^1$H-NMR spectrum of the thus obtained ditetrahydrobenzyl ether was measured.

$^1$H-NMR (CDCl$_3$): δ 1.23-1.33 (m, 2H), 1.68-1.94 (m, 6H), 2.02-2.15 (m, 6H), 3.26-3.34 (m, 4H), 5.63-7.70 (m, 4H)

A reactor was charged with the thus obtained ditetrahydrobenzyl ether (200 g, 0.97 mole), 20% by weight SP-D (acetic acid solution) (0.39 g), and ethyl acetate (669 mL), and was heated to 40° C. Subsequently, a 29.1% by weight peracetic acid solution in ethyl acetate (608 g) was added thereto in a dropwise manner over 5 hours, and the resultant was aged for 3 hours. Thereafter, the thus obtained organic layer was washed with an alkaline aqueous solution three times and with ion-exchanged water twice, and the resultant was distilled under reduced pressure to obtain bis(3,4-epoxycyclohexylmethyl) ether in the form of a colorless transparent liquid (yield: 77%).

Production Example 3 (Production of 2,2-Bis(3,4-epoxycyclohexane-1-yl)propane (a-3))

A 1 L jacketed flask equipped with a stirrer, a condenser, a thermometer, and a nitrogen-introducing tube was charged with 36 g of water, 12.0 g of sodium bisulfate, 500 g of isopropylidene-4,4'-dicyclohexanol (manufactured by Aldrich), and 500 g of Solvesso 150 (manufactured by Exxon Mobil Corporation) used as a solvent, and the resultant was subjected to a dehydrogenation reaction at 100° C. When the distillation of water stopped, the reaction was completed.

The thus obtained reaction solution was analyzed by gas chromatography, resulting in finding that 2,2-bis(3,4-cyclohexenyl)propane had been produced in a yield of 96%. The thus obtained reaction solution was washed with 500 mL of ion-exchanged water using a separatory funnel, and then the resultant organic layer was distilled under reduced pressure to obtain 387.0 g of 2,2-bis(3,4-cyclohexenyl)propane in the form of a colorless transparent liquid. The purity was 96.1%.

A 1 L jacketed flask similar to that described above was charged with 100 g of the thus obtained 2,2-bis(3,4-cyclohexenyl)propane and 30 g of ethyl acetate, and with nitrogen blown into a gas phase portion and with the temperature within the reaction system set to 30° C., 307.2 g of a 29.1% by weight peracetic acid solution in ethyl acetate (moisture content: 0.47% by weight) was added thereto in a dropwise manner over about 2 hours. After completing the dropwise addition, the resultant was aged at 30° C. for 3 hours, and the reaction was completed. The completed reaction solution was washed with water at 30° C., a low-boiling point compound was removed at 70° C./20 mmHg, and thus 99.4 g of 2,2-bis(3,4-epoxycyclohexane-1-yl)propane was obtained.

As properties of the thus obtained product, the oxirane oxygen content was 11.3% and the viscosity was 3550 cP (25° C.), and it was found, based on the $^1$H-NMR thereof, that a peak derived from an internal double bond in the vicinity of δ 4.5 to 5 ppm had disappeared, and that a proton peak derived from an epoxy group had been generated in the vicinity of δ 2.9 to 3.1 ppm.

Examples 1 to 6 and Comparative Examples 1 to 4

Homogeneous transparent curable compositions were obtained by blending respective components in accordance with blending compositions shown in Table 1 below (unit: parts by weight), and mixing, under stirring, the resultant at room temperature using a planetary centrifugal mixer. The thus obtained curable compositions were evaluated in accordance with the following evaluation methods.

[Viscosity]

The viscosity (Pa·s) of each of the curable compositions of Examples and Comparative Examples was measured using a rheometer (tradename "PHYSICA UDS200", manufactured by Paar Physica) at a temperature of 25° C. and a rotational speed of 20/sec.

[5% Weight Loss Temperature]

A Teflon® spacer with a length of 20 mm× a width of 20 mm× a thickness of 0.5 mm was prepared, and was sandwiched between slides (tradename "S2111", manufactured by Matsunami Glass Ind., Ltd.) having been subjected to a release treatment [performed by immersing in tradename "Optool HD1000" (manufactured by Daikin Industries, Ltd.) and allowing to stand in a draft for 24 hours]. Each of the curable compositions was poured into a gap thus formed, and was irradiated with light using a UV-LED under the following conditions to obtain a cured product. Ten (10) mg of the thus obtained cured product was cut out to evaluate the heat resistance by measuring a 5% weight loss temperature using a TG-DTA (tradename "EXSTAR 6300", manufactured by Hitachi High-Tech Science Corporation) under the following conditions.

(Conditions for Light Irradiation)
<UV-LED>
Irradiation device: tradename "365 nm LED UNIT" (manufactured by Ushio Inc.)
Wavelength: 365 nm
Irradiation intensity: 100 mW/cm
Cumulative irradiation: 3000 mJ/cm$^2$
(Conditions for TG-DTA)
Temperature increase rate: 20° C./min
Atmosphere: nitrogen
Temperature condition: 30° C. to 400° C.

[Transparency (YI)]

A sample similar to the cured product in which the 5% weight loss temperature was measured was prepared, and the transmittance of the cured product was measured. The transparency was evaluated by measuring a yellowness index (YI) of the obtained cured product with a spectrophotometer (tradename "U-3900", manufactured by Hitachi High-Technologies Corporation). It is noted that the yellowness index (YI) was obtained by reading a value of a two-degree visual field in a D65 light source. The results are shown in a row of "Transparency (YI)" of Table 1.

[Heat-Resistant Transparency (YI)]

A cured product obtained by the same method as in the evaluation of "Transparency (YI)" described above was subjected, continuously three times, to a heat-resistance test based on a reflow temperature profile (maximum temperature: 270° C.) according to JEDEC Standards by using a table-top reflow oven (manufactured by Shinapex Co., Ltd.), and a yellowness index (YI) was measured in the same manner as described above for evaluating heat yellowing resistance (heat-resistant transparency). The results are shown in a row of "Heat-resistant Transparency (YI)" of Table 1.

[Light-Resistant Transparency (YI)]

A cured product obtained in the same manner as in the evaluation of "Transparency (YI)" described above was irradiated with light under the following conditions for performing a light-resistance test. A yellowness index (YI) was measured in the same manner as described above for evaluating light yellowing resistance (light-resistant transparency). The results are shown in a row of "Light-resistant Transparency (YI)" of Table 1.

<Light Irradiation Conditions for Light-Resistance Test>

Irradiation Device: tradename "LC-8" (manufactured by Hamamatsu Photonics K.K.)

Irradiation Intensity: 100 mW/cm

Cumulative Irradiation: 5000 mJ/cm$^2$ amide, manufactured by BASF corporation, maximum absorption wavelength: 307 nm)

TINUVIN 928: tradename "TINUVIN 928" (2-(2H-benzotriazole-2-yl)-6-(1-methyl-2-phenylethyl)-4-(1,1,3,3-tetramethylbutyl)phenol, manufactured by BASF corporation, maximum absorption wavelength: 349 nm)

TINUVIN 400: tradename "TINUVIN 400" (reaction product of 2-(4,6-bis(2,4-dimethylphenyl)-1,3,5-triazine-2-yl)-5-hydroxyphenyl and oxirane, manufactured by BASF corporation, maximum absorption wavelength: 336 nm)

<Optical Cationic Polymerization Initiator>

CPI-101A: tradename "CPI-101A" (50% solution of 4-(phenylthio)phenyldiphenylsulfonium hexafluoroantimonate in propylene carbonate, manufactured by San-Apro Ltd.)

(c-1): 4-(phenylthio)phenyldiphenylsulfonium phenyltris(pentafluorophenyl)borate

TABLE 1

|  |  | Example | | | | | | Comparative Example | | | |
| --- | --- | --- | --- | --- | --- | --- | --- | --- | --- | --- | --- |
|  |  | 1 | 2 | 3 | 4 | 5 | 6 | 1 | 2 | 3 | 4 |
| Component (A) | CELLOXIDE 2021P | 80 | | | | | | | | | |
|  | (a-1) | | 30 | | | 30 | 30 | 30 | | 30 | 30 |
|  | (a-2) | | | 30 | | | | | | | |
|  | (a-3) | | | | 30 | | | | | | |
| Light Resistance Imparting Agent | TINUVIN312 | 0.2 | 0.2 | 0.2 | 0.2 | 0.2 | | | 0.2 | | |
|  | TINUVIN315 | | | | | | 0.2 | | | | |
|  | TINUVIN928 | | | | | | | | | 0.2 | |
|  | TINUVIN400 | | | | | | | | | | 0.2 |
| Optical Cationic Polymerization Initiator | CPI-101A | 0.5 | 0.5 | 0.5 | 0.5 | | | 0.5 | 0.5 | 0.5 | 0.5 |
|  | (c-1) | | | | | 0.5 | | | | | |
|  | CPI-100P | | | | | | 2 | | | | |
| Other Cationic Curable Compound | PCL305 | 20 | | | | | | 20 | | | |
|  | YX8000 | | 40 | 30 | 40 | 40 | 40 | 40 | 40 | 40 | 40 |
|  | YH300 | | 20 | 20 | 20 | 30 | 20 | 20 | 30 | 20 | 20 |
|  | OXT221 | | 10 | 20 | 10 | | 10 | 10 | 10 | 10 | 10 |
| Antioxidant | IN1010 | 0.5 | 0.5 | 0.5 | 0.5 | 0.5 | 0.5 | 0.5 | 0.5 | 0.5 | 0.5 |
| Evaluation | Viscosity (mPa·s) | 273 | 165 | 368 | 640 | 273 | 153 | 161 | 463 | 190 | 187 |
|  | 5% Weight Loss Temperature(° C.) | 341 | 381 | 372 | 389 | 370 | 332 | 386 | Not Cured | Not Cured | 379 |
|  | Transparency (YI) | 0.8 | 0.9 | 0.7 | 1.1 | 0.8 | 1.1 | 0.9 | | | 8.2 |
|  | Heat-Resistant Transparency (YI) | 1.2 | 0.8 | 0.9 | 1.3 | 1.7 | 1.3 | 1.0 | | | 3.6 |
|  | Light-Resistant Transparency (YI) | 1.2 | 0.7 | 0.7 | 1.4 | 1.0 | 1.3 | 4.2 | | | 8.0 |

Names of compounds shown as the respective components in Table 1 are as follows. It is noted that the "maximum absorption wavelength" of each light resistance imparting agent is the maximum absorption wavelength in an ultraviolet-visible light absorption spectrum from 250 to 400 nm.

<Component (A)>

CELLOXIDE 2021P: tradename "CELLOXIDE 2021P" (3,4-epoxycyclohexylmethyl (3,4-epoxy)cyclohexane carboxylate, manufactured by Daicel Corporation)

(a-1): compound obtained in Production Example 1, (3,4,3',4'-diepoxy)bicyclohexyl (a-2): compound obtained in Production Example 2, bis(3,4-epoxycyclohexylmethyl) ether (a-3): compound obtained in Production Example 3, 2,2-bis(3,4-epoxycyclohexane-1-yl)propane <Light Resistance Imparting Agent>

TINUVIN 312: tradename "TINUVIN 312" (N-(2-ethoxyphenyl)-N'-(2-ethylphenyl)oxamide, manufactured by BASF Corporation, maximum absorption wavelength: 305 nm)

TINUVIN 315: tradename "TINUVIN 315" (N-(5-tert-butyl-2-ethoxyphenyl)-N'-(4-tert-butyl-2-ethylphenyl)ox- CPI-100P: tradename "CPI-100P" (50% solution of 4-(phenylthio)phenyldiphenylsulfonium hexafluorophosphate in propylene carbonate, manufactured by San-Apro Ltd.)

<Other Cationic Curable Compounds>

PCL305: tradename "Placcel 305" (polycaprolactone triol, molecular weight: 550, manufactured by Daicel Corporation)

YX8000: tradename "YX8000" (hydrogenated bisphenol A diglycidyl ether, manufactured by Mitsubishi Chemical Corporation)

YH-300: tradename "YH-300" (polyglycidyl ether of trimethylolpropane, manufactured by Nippon Steel & Sumikin Chemical Co., Ltd.)

OXT221: tradename "Arone Oxetane OXT-221" (3-ethyl-3{[(3-ethyloxetane-3-yl)methoxy]methyl}oxetane, manufactured by Toagosei Co., Ltd.)

<Antioxidant>

IN1010: tradename "Irganox 1010" (pentaerythritol tetrakis[3-(3,5-di-t-butyl-4-hydroxyphenyl)propionate], manufactured by BASF Corporation)

INDUSTRIAL APPLICABILITY

The curable composition of the present invention can be suitably used as an optical element material (such as a lens or prism material, a sealant, a material for forming an optical waveguide, an adhesive, a material for forming an optical fiber, an imprinting material, or a material for forming alternative glass), a resist, a coating agent and the like.

The invention claimed is:

1. A curable composition, comprising the following component (A), the following component (B), the following component (C), and not less than two compounds having not less than one glycidyl ether group in a molecule, as a compound having not less than one epoxy group in a molecule and being different from the component (A),
wherein a content of the compound having not less than one epoxy group in a molecule and being different from the component (A) in a total amount of cationic curable compounds contained in the curable composition is 15 to 85% by weight:
the component (A): an alicyclic epoxy compound represented by the following formula (a):

[Formula 1]

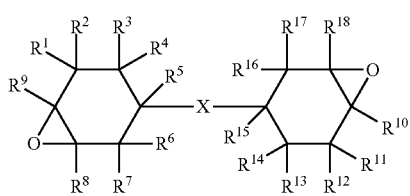

wherein $R^1$ to $R^{18}$ are the same as or different from one another and represent a hydrogen atom, a halogen atom, a hydrocarbon group that may contain an oxygen atom or a halogen atom, or an alkoxy group that may have a substituent; and X represents a single bond or a linking group;
the component (B): a light resistance imparting agent having a maximum absorption wavelength in a region between 280 and 320 nm in an ultraviolet-visible light absorption spectrum from 250 to 400 nm; and
the component (C): an optical cationic polymerization initiator.

2. The curable composition according to claim 1, further comprising an antioxidant.

3. The curable composition according to claim 1, further comprising a phenol-based antioxidant.

4. A cured product obtained by curing the curable composition according to claim 1.

5. A method for producing a cured product, wherein a curable composition containing the following component (A), the following component (B), the following component (C) and not less than two compounds having not less than one glycidyl ether group in a molecule, as a compound having not less than one epoxy group in a molecule and being different from the component (A) is irradiated with a UV-LED (wavelength: 350 to 400 nm),
wherein a content of the compound having not less than one epoxy group in a molecule and being different from the component (A) in a total amount of cationic curable compounds contained in the curable composition is 15 to 85% by weight:
the component (A): an alicyclic epoxy compound represented by the following formula (a):

[Formula 1]

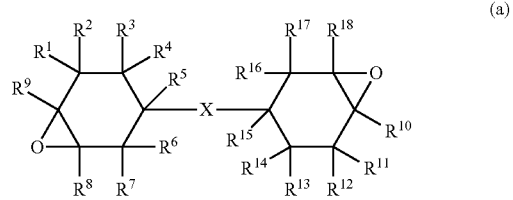

wherein $R^1$ to $R^{18}$ are the same as or different from one another and represent a hydrogen atom, a halogen atom, a hydrocarbon group that may contain an oxygen atom or a halogen atom, or an alkoxy group that may have a substituent; and X represents a single bond or a linking group;
the component (B): a light resistance imparting agent having a maximum absorption wavelength in a region between 280 and 320 nm in an ultraviolet-visible light absorption spectrum from 250 to 400 nm; and
the component (C): an optical cationic polymerization initiator.

6. An optical element, comprising the cured product according to claim 4.

7. An optical device, comprising the optical element according to claim 6.

8. The curable composition according to claim 1, wherein the component (C) is a sulfonium salt-based compound.

9. The curable composition according to claim 1, wherein the component (B) is a compound represented by the following formula (c):

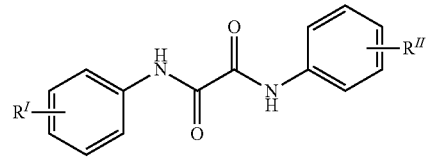

wherein $R^I$ and $R^{II}$ is the same as or different from each other and represent a hydrogen atom, an alkyl group that may have a substituent, an alkoxy group that may have a substituent, or an alkylthio group that may have a substituent, and
as $R^I$ and $R^{II}$, the compound represented by the formula (c) comprises two of one or more groups selected from an alkyl group that may have a substituent, an alkoxy group that may have a substituent, and an alkylthio group that may have a substituent.

10. The curable composition according to claim 1, wherein a content of the component (B) in the curable composition is not less than 0.01% by weight and less than 5% by weight.

11. The curable composition according to claim 1, wherein an amount of the component (C) is 0.1 to 5 parts by weight with respect to 100 parts by weight of the cationic curable compounds contained in the curable composition.

12. The curable composition according to claim 1, wherein a content of the component (A) in the curable composition is 20 to 85% by weight with respect to the total amount of the curable composition.

13. The curable composition according to claim 1, wherein a content of a cationic curable compound different from the component (A) is 15 to 75% by weight with respect to the total amount of the curable composition.

14. The curable composition according to claim 9, wherein the component (C) is a sulfonium salt-based compound, and
an amount of the component (C) is 0.1 to 5 parts by weight with respect to 100 parts by weight of the cationic curable compounds contained in the curable composition.

15. The curable composition according to claim 14, wherein a content of the component (B) in the curable composition is not less than 0.01% by weight and less than 5% by weight.

16. The curable composition according to claim 15, wherein a content of the component (A) in the curable composition is 20 to 85% by weight with respect to the total amount of the curable composition.

17. The curable composition according to claim 16, wherein a content of a cationic curable compound different from the component (A) is 15 to 75% by weight with respect to the total amount of the curable composition.

18. The curable composition according to claim 17, further comprising a phenol-based antioxidant.

* * * * *